United States Patent
Kotvis et al.

(10) Patent No.: US 12,192,304 B2
(45) Date of Patent: Jan. 7, 2025

(54) SYSTEMS AND METHODS FOR EDGE CACHING

(71) Applicant: Insight Direct USA, Inc., Chandler, AZ (US)

(72) Inventors: Benjamin Kotvis, Sussex, WI (US); Marc Brumfield, Lemont, IL (US)

(73) Assignee: Insight Direct USA, Inc., Chandler, AZ (US)

( * ) Notice: Subject to any disclaimer, the term of this patent is extended or adjusted under 35 U.S.C. 154(b) by 38 days.

(21) Appl. No.: 18/114,731

(22) Filed: Feb. 27, 2023

(65) Prior Publication Data
US 2024/0291905 A1    Aug. 29, 2024

(51) Int. Cl.
    *G06F 15/16*         (2006.01)
    *H04L 67/1008*    (2022.01)
    *H04L 67/288*     (2022.01)
    *H04L 67/568*     (2022.01)

(52) U.S. Cl.
CPC ........ *H04L 67/568* (2022.05); *H04L 67/1008* (2013.01); *H04L 67/288* (2013.01)

(58) Field of Classification Search
CPC .......................... H04L 67/568; H04L 67/1008
See application file for complete search history.

(56) References Cited

U.S. PATENT DOCUMENTS

| | | |
|---|---|---|
| 6,976,090 B2 | 12/2005 | Ben-Shaul et al. |
| 7,447,909 B2 | 11/2008 | Reith |
| 8,073,970 B2 | 12/2011 | Schwimer |
| 8,161,159 B1 | 4/2012 | Shetty et al. |
| 8,423,672 B2 | 4/2013 | Liu et al. |
| 8,660,115 B2 | 2/2014 | Cranor et al. |
| 8,880,587 B2 | 11/2014 | Cobb et al. |
| 8,881,285 B2 | 11/2014 | Macwan et al. |
| 9,043,428 B2 | 5/2015 | Lobo et al. |
| 9,154,419 B2 | 10/2015 | Zhou |

(Continued)

FOREIGN PATENT DOCUMENTS

| | | |
|---|---|---|
| CN | 100583820 C | 1/2010 |
| CN | 101741869 B | 4/2013 |

(Continued)

OTHER PUBLICATIONS

"Lockheed Martin, Juniper Networks Demonstrate Mission-Aware Routing Technology for Department of Defense." Juniper Networks Inc. (Feb. 2, 2023). Retrieved Mar. 22, 2023, from https://newsroom.juniper.net/news/news-details/2023/Lockheed-Martin-Juniper-Networks-Demonstrate-Mission-Aware-Routing-Technology--for-Department-of-Defense/default.aspx.

*Primary Examiner* — Joseph R Maniwang
(74) *Attorney, Agent, or Firm* — Kinney & Lange, P.A.

(57) ABSTRACT

A method of selectively providing data from a caching edge device includes receiving a request from a local device for data stored on a server, the caching edge device configured to receive requests from the local device and to selectively forward the requests to the server and determining whether to deliver to the local device a copy of the data by analyzing the request using a forwarding rules engine, the copy of the data stored to a memory of the caching edge device. The method further includes, after determining to deliver the copy of the data to the local device, electronically transmitting the copy of the data from the memory of the edge caching device to the local device and blocking, by the edge caching device, the request from the local device to the server.

11 Claims, 5 Drawing Sheets

(56) References Cited

U.S. PATENT DOCUMENTS

| | | |
|---|---|---|
| 9,258,227 B2 | 2/2016 | Ghosh et al. |
| 9,317,470 B1 * | 4/2016 | Raley .................... H04L 67/568 |
| 9,525,563 B2 | 12/2016 | Zhou et al. |
| 9,607,097 B2 | 3/2017 | Chan |
| 9,729,675 B2 | 8/2017 | Luecke et al. |
| 9,742,657 B2 | 8/2017 | Narayanan et al. |
| 9,800,683 B2 | 10/2017 | Phillips et al. |
| 9,888,003 B2 | 2/2018 | Harrang et al. |
| 9,923,897 B2 | 3/2018 | Houston et al. |
| 9,942,825 B1 | 4/2018 | Narayanan |
| 10,140,125 B1 | 11/2018 | Bhasin et al. |
| 10,270,817 B2 | 4/2019 | Weihl et al. |
| 10,298,615 B2 | 5/2019 | Gero et al. |
| 10,567,269 B2 | 2/2020 | Chakra et al. |
| 10,735,503 B2 | 8/2020 | Shattil |
| 10,743,036 B1 | 8/2020 | Farris et al. |
| 10,958,662 B1 | 3/2021 | Sole et al. |
| 10,977,747 B2 | 4/2021 | Blumofe et al. |
| 10,979,341 B2 | 4/2021 | Uttaro et al. |
| 11,032,387 B2 | 6/2021 | Newton et al. |
| 11,218,437 B2 | 1/2022 | Chen et al. |
| 11,228,950 B2 | 1/2022 | Shen |
| 11,412,060 B2 | 8/2022 | Yanagihara et al. |
| 11,431,776 B2 | 8/2022 | Upadhyaya et al. |
| 11,438,371 B2 | 9/2022 | Nainar et al. |
| 11,457,091 B2 | 9/2022 | Crowder et al. |
| 11,477,846 B2 | 10/2022 | Fang et al. |
| 11,483,594 B2 | 10/2022 | Kalish |
| 11,546,767 B1 | 1/2023 | Shaw et al. |
| 11,570,666 B2 | 1/2023 | Ghadge et al. |
| 11,575,481 B2 | 2/2023 | Han et al. |
| 11,588,885 B2 | 2/2023 | Choi |
| 11,593,446 B2 | 2/2023 | Shribman et al. |
| 11,611,504 B2 | 3/2023 | Shenoy |
| 11,611,507 B2 | 3/2023 | Ramaswamy et al. |
| 11,611,508 B2 | 3/2023 | Yang |
| 11,611,905 B2 | 3/2023 | Yu |
| 2003/0065743 A1 * | 4/2003 | Jenny ........................ H04L 9/40 709/219 |
| 2012/0117239 A1 * | 5/2012 | Holloway ............... H04L 67/59 709/226 |
| 2013/0054831 A1 | 2/2013 | Calo et al. |
| 2015/0373139 A1 * | 12/2015 | Kisel .................. H04L 67/1001 709/213 |
| 2016/0154659 A9 * | 6/2016 | Khalid ................ H04L 41/5019 718/1 |
| 2021/0191979 A1 | 6/2021 | Agrawal et al. |

FOREIGN PATENT DOCUMENTS

| | | |
|---|---|---|
| CN | 101984637 B | 6/2014 |
| CN | 108549719 A | 9/2018 |
| CN | 108307446 B | 1/2020 |
| CN | 108718236 B | 8/2020 |
| CN | 107786520 B | 2/2021 |
| CN | 108495340 B | 6/2021 |
| CN | 110933692 B | 6/2021 |
| CN | 108141465 B | 7/2021 |
| CN | 111491175 B | 8/2021 |
| CN | 110958656 B | 9/2021 |
| CN | 111031102 B | 4/2022 |
| CN | 108174235 B | 5/2022 |
| CN | 113115340 B | 6/2022 |
| CN | 112671880 B | 8/2022 |
| CN | 217116413 U | 8/2022 |
| CN | 112559170 B | 9/2022 |
| CN | 112264309 B | 12/2022 |
| CN | 113422801 B | 12/2022 |
| EP | 1865684 A1 | 12/2007 |
| EP | 2642393 B1 | 9/2019 |
| EP | 3504847 B1 | 6/2022 |
| KR | 102443581 B1 | 9/2022 |
| WO | 2015001495 A1 | 1/2015 |
| WO | 2015036942 A1 | 3/2015 |
| WO | 2016074323 A1 | 5/2016 |
| WO | 2016107391 A1 | 7/2016 |

* cited by examiner

SYSTEMS AND METHODS FOR EDGE CACHING

BACKGROUND

The present disclosure relates to caching and, more particularly, systems and methods for selectively providing data from a local cache.

Devices connected to a local network often access resources hosted by servers and other devices connected to another network, such as a wide area network (WAN). Interruptions to the connection between the local network and the outside network can disrupt functions of devices connected to the local network that are dependent on resources hosted on the outside network.

SUMMARY

An example of a method of selectively providing data from a caching edge device includes receiving a request from a local device for data stored on a server, the caching edge device configured to receive requests from the local device and to selectively forward the requests to the server and determining whether to deliver to the local device a copy of the data by analyzing the request using a forwarding rules engine, the copy of the data stored to a memory of the caching edge device. The request is received by the caching edge device and the determination of whether to deliver the copy of the data is made by the caching edge device. The method further includes, after determining to deliver the copy of the data to the local device, electronically transmitting the copy of the data from the memory of the edge caching device to the local device and blocking, by the edge caching device, the request from the local device to the server.

An example of a system includes a local device connected to a local network, a server not connected to the local network and accessible by a wide area network, a caching edge device connected to the local device by the local network and connected to the wide area network. The caching device is configured to receive requests from the local device and to selectively forward the requests to the server, and includes a processor and at least one memory. The at least one memory is encoded with instructions that, when executed, cause the processor to receive a request from the local device for data stored on the server and determine, before forwarding the request for the data to the server, whether to deliver to the local device a copy of the data by analyzing the request using a forwarding rules engine, the copy of the data stored to the at least one memory of the caching edge device. The instructions, when executed, further cause the processor to, after determining to deliver the copy of the data to the local device, electronically transmit the copy of the data from the at least one memory of the edge caching device to the local device and block the request from the local device to the server.

DETAILED DESCRIPTION

The present description relates to systems and methods for local caching of data using a caching edge device. The caching edge devices of the present description are able to be integrated into existing local networks at a point between the local network and an outside or external network, such as the Internet or another WAN, that causes network traffic to pass through the caching edge device to selectively forward and block requests from local devices of the local network intended for servers and other devices of the WAN. The caching edge devices of the present disclosure include and/or are operatively connected (i.e., via a direct connection or via the local network) to a cache such that the caching edge device can deliver data from the cache to local devices of the local network. The caching edge devices of the present disclosure are configured to selectively block outbound requests (i.e., requests destined for a device of the WAN) and instead deliver data from the cache.

Advantageously, the systems and methods disclosed herein allow for local devices to perform operations that require data hosted by a device accessible only by connection to a WAN when the connection to the WAN is disrupted (e.g., in examples where a network connection is intermittent). Further, the systems and methods disclosed herein allows for local devices to access data that is usually remotely-hosted on a WAN-connected device when data transmission to the WAN is undesirable or when data transmission and/or access is associated with increased costs. For example, the connection between the WAN and the local network may be metered or data-capped, or there may be charged associated with accessing and downloading data from a WAN-connected device. Further, the systems and methods disclosed herein do not require modification of existing local devices, applications, and/or programs. Rather, the systems and methods disclosed herein allow for the creation of a caching edge device capable of inspecting outbound data requests and automatically determining whether to provide data from a local cache. Accordingly, the caching edge devices disclosed herein can advantageously be integrated into existing local networks with significantly less labor and at lower cost than existing techniques for providing local caching.

Figure 1:
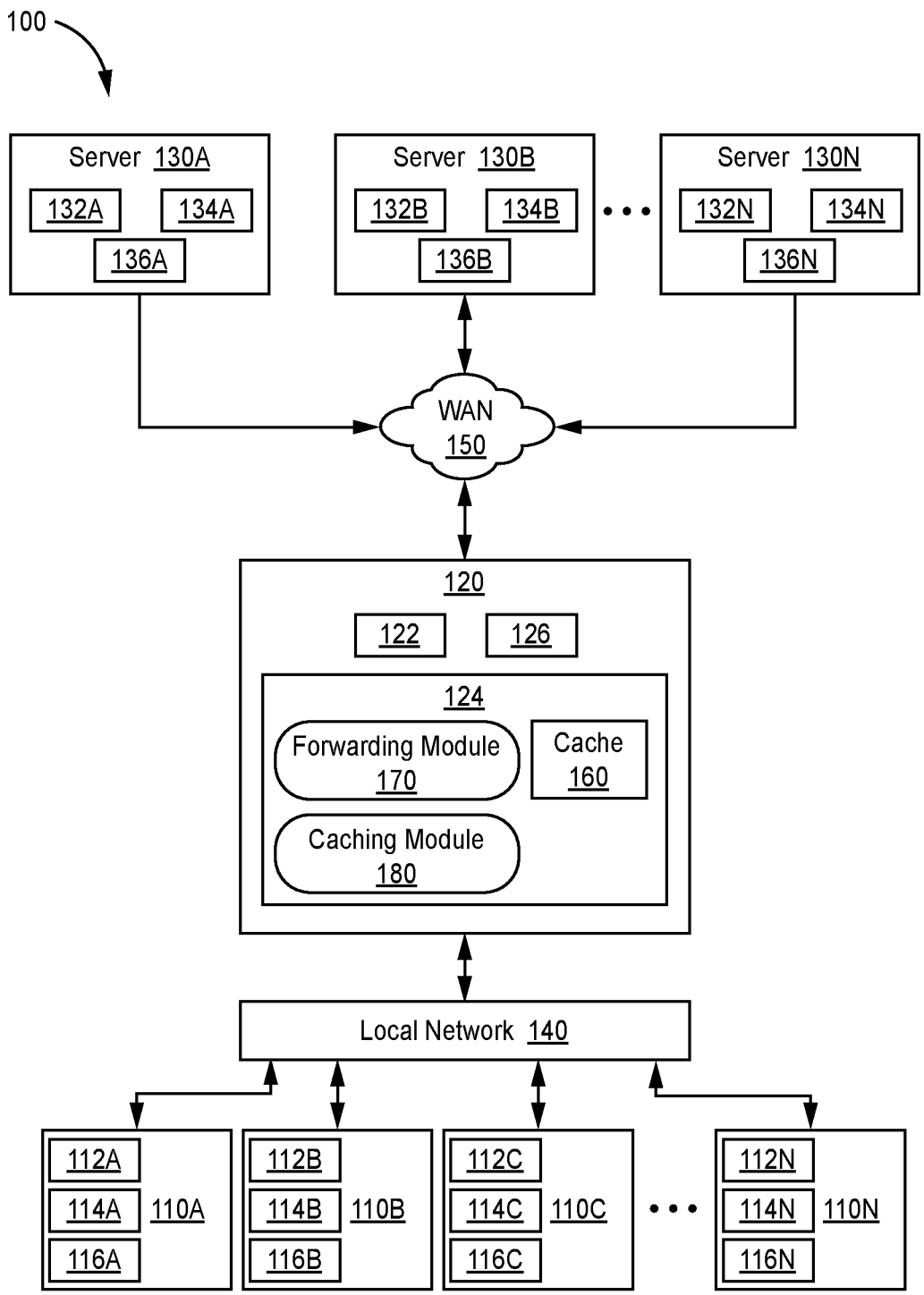
FIG. 1 is a schematic view of an example of a system for local network edge caching.

FIG. 1 is a schematic diagram of system 100, which is a system for local network edge caching. System 100 includes local devices 110A-N, caching edge device 120, and servers 130A-N. Local devices 110A-N include processors 112A-N, memories 114A-N, and user interfaces 116A-N. Caching edge device 120 includes processor 122, memory 124, and user interface 126. Servers 130A-N includes processors 132A-N, memories 134A-N, and user interfaces 136A-N. Local devices 110A-N are connected to caching edge device 120 by local network 140 and caching edge device 120 is connected to server 130 by WAN 150. Memory 124 includes forwarding module 170, caching module 180, and cache 160.

Local devices 110A-N are electronic devices connected to local network 140. Local devices 110A-N are collectively referred to herein as "local device 110" or "local devices 110." Each of local devices 110A-N can be, for example, a computer, an unmanned aerial vehicle, an electronic sensor, a computer vision device, an automated guided vehicle, a virtual reality device, or an augmented reality device, among other options. All of local devices 110A-N include networking capability such that each local device 110 can connect to local network 140. Each of local devices 110 can be connected to local network 140 via a wired or wireless connection. In at least some examples, local network 140 is a private cellular network (PCN) including one or more PCN gateway devices. In these examples, each of local devices 110 can be connected directly to the PCN and/or can be connected to the PCN via a PCN gateway device.

Local devices 110A-N include processors 112A-N, memories 114A-N, and user interfaces 116A-N. Processors 112A-N are collectively referred to herein as "processor 112" or "processors 112;" memories 114A-N are collectively referred to herein as "memory 114" or "memories 114;" and user interfaces 116A-N are collectively referred to herein as "user interface 116" or "user interfaces 116."

Each of processors 112A-N can execute software, applications, and/or programs stored on memories 114A-N, respectively. Examples of processors 112A-N can include one or more of a processor, a microprocessor, a controller, a digital signal processor (DSP), an application specific integrated circuit (ASIC), a field-programmable gate array (FPGA), or other equivalent discrete or integrated logic circuitry. Each of processors 112A-N can be entirely or partially mounted on one or more circuit boards.

Each of memories 114A-N is configured to store information and, in some examples, can be described as a computer-readable storage medium. A memory 114, in some examples, can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, one or more of memories 114A-N is a temporary memory. As used herein, a temporary memory refers to a memory having a primary purpose that is not long-term storage. One or more of memories 114A-N, in some examples, is described as volatile memory. As used herein, a volatile memory refers to a memory that that the memory does not maintain stored contents when power to the memory 114 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on a local device 110 to temporarily store information during program execution.

One or more of memories 114A-N, in some examples, also includes one or more computer-readable storage media. Memories 114A-N can be configured to store larger amounts of information than volatile memory. One or more of memories 114A-N can further be configured for long-term storage of information. In some examples, one or more of memories 114A-N includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interfaces 116A-N are input and/or output devices and enable an operator to control operation of local devices 110A-N, respectively. Each of user interfaces 116A-N can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Caching edge device 120 is an edge device of local network 140. As will be explained in more detail subsequently, caching edge device 120 is capable of caching data from servers 130A-N and delivering that data to user devices 110. Caching edge device 120 is also capable of receiving and forwarding data between local network 140 and wide area network 150. More specifically, caching edge device 120 is also capable of receiving outbound network data from local devices 110 and forwarding that outbound network data to servers 130. Caching edge device 120 is further capable of receiving inbound network data from servers 130 and transmitting the inbound network data to local devices 110. The inbound and/or outbound data can be, for example, one or more network packets. In some examples, the data received by caching edge device 120 from local devices 120 and forwarded to servers 130 includes requests for data stored on servers 130.

Caching edge device 120 includes processor 122 and memory 124, and optionally user interface 126. Processor 122 and memory 124 are substantially similar to processor 112 and memory 114, respectively, as discussed with respect to local devices 120A-N. User interface 126 is substantially similar to user interface 116 of local devices 120A-N. In some examples, caching edge device 120 does not include a user interface. In these examples, caching edge device can be configured and/or operated using, for example, one of local devices 120A-N connected to caching edge device 120 via local network 140.

Local network 140 is a network that connects local machines 110 to caching edge device 120. In some examples, local network 140 can also connect local machines 110 to others of local machines 110, such that local machines 110 are able to send and receive data from others of local machines 110 via local network 140. Local network 140 is distinct from WAN 150 and generally connects fewer devices than WAN 150. Local network 140 is not directly connected to WAN 150 and data intended for a server or other computer connected to WAN 150 is routed through caching edge device 120. Local network 140 can be a wired or wireless network and can include one or more switches, routers, gateways, or other suitable network infrastructure. Local network 140 can be, for example, a local area network, a campus area network, a metropolitan area network, or another suitable network type. Generally, local network 140 connects local devices 110 that are separated by large geographic distances than the devices of WAN 150.

Servers 130A-130N are electronic devices that are not directly connected to local network 140. Servers 130A-130N store data and/or perform compute tasks. Servers 130A-N are generally referred to herein as servers, but it is understood that servers 130A-N can be any suitable computing device for storing data and/or performing compute tasks. Servers 130A-N are connected to WAN 150 and include networking capability, such that servers 130A-N are capable of sending and receiving network data, and more specifically of sending network data to and receiving network data from caching edge device 120. Servers 130A-N are collectively referred to herein as "server 130" or "servers 130."

Servers 130A-N include processors 132A-N and memories 134A-N, and optionally include user interfaces 136A-N. Processors 132A-N are collectively referred to herein as "processor 132" or "processors 132;" memories 134A-N are collectively referred to herein as "memory 134" or "memories 134;" and user interfaces 136A-N are collectively referred to herein as "user interface 136" or "user interfaces 136." Processors 132, memory 134 are substantially similar to processor 112, 122 and memory 114, 124, respectively. User interface 136 is substantially similar to user interface 116, 126. In some examples, one more servers 130A-N do not include a user interface and can be configured and/or operated using, for example, another device connected the server(s) 130 via WAN 150 or another suitable network.

The memory 134 of each server 130 can store data that can be requested by a local device 110, and further can store one or more programs that can be executed by the processor 132 of the server 130. Programs of a server 130 can be configured to execute following receipt of a request for an output of a program by a local device 110.

WAN 150 is a wide area network suitable for connecting servers and other computing devices that are separated by greater geographic distances than the devices of local network 140. WAN 150 includes network infrastructure for connecting devices separated by larger geographic distances. In at least some examples, WAN 150 is the Internet. Caching edge device 120 is connected to WAN 150 by communication link 152. Communication link 152 can be a wired or wireless connection. In at least some examples, communication link 152 is a satellite connection. In operation, communication link 152 can be disrupted, such that caching edge device 120 becomes disconnected from WAN 150. In these examples, communication link 152 can be referred to as an "intermittent connection." The disruptions to communication link 152 are generally temporary but can persist for extended periods of time while repairs, maintenance, or other suitable steps are taken to restore communication link 152. For example, where communication link 152 is a wireless connection, poor signal quality can cause disruption of communication facilitated by communication link 152 between the devices of local network 140 and the devices of WAN 150. As a further example, where communication link 152 is a wired connection, mechanical damage to communication link 152 can disrupt communication between the devices of local network 140 and the devices of WAN 150. While communication link 152 is disrupted, local devices 110 and other devices of local network 140 are not able to communicate to devices connected to WAN 150 (e.g., servers 130).

Cache 160 is a cache of data from one or more of servers 130A-N that can be delivered to a local device 110A-N in response to a request from a local device 110A-N for data from a server 130A-N. The data can be encoded information stored to the server 130, such as one or more application libraries, or the data can be an output from one or more applications or services hosted and/or served by the server 130. Caching edge device 120 can request data from one or more of servers 130A-N and store a copy of the data to cache 160. In some examples, memory 114 can include multiple memory devices and cache 160 can be stored on a hardware memory device of caching edge device 120 that is different than the memory device that stores forwarding module 170, caching module 180, or other software components of caching edge device 120. Additionally and/or alternatively, cache 160 can be stored to a partition and/or volume of a memory device that also stores forwarding module 170, caching module 180, and/or other software components of caching edge device 120.

In operation, caching edge device 120 can scan outbound requests from local devices 110A-N for data from a server 130A-N. If the requested data is stored to cache 160, caching edge device 120 can block the outbound request from the local device 110 and instead deliver the copy of the requested data stored to cache 160. Alternatively, caching edge device 120 can function as an edge device and forward a request for data from a local device 110 to a server 130, and forward the requested data received from the server 130 back to the local device 110. In this manner caching edge device 120 is configured to selectively forward requests for data from local devices 110 to servers 130.

Cache 160 can store data from more than one server 130A-N. Further, the data stored to cache 160 can be selected based on, for example, how often a particular data source is requested from servers 130, the storage volume of cache 160, the stability of communication link 152 between caching edge device 120 and WAN 150, characteristics of local devices 110, or a characteristic of local network 140, among other options. Caching edge device 120 can periodically and, in some examples, automatically update data stored to cache 160 if the corresponding data on a server 130 has been updated. Caching edge device 120 can be configured to, for example, periodically download an updated copy of a data file that is stored to cache 160 from a server 130. Additionally and/or alternatively, caching edge device 120 can be configured to determine whether copies of data files stored to cache 160 have identity with the corresponding data files stored to servers 130 (e.g., by requesting an identity value from a server 130).

Forwarding module 170 includes one or more programs for determining whether to forward network traffic from a local device 110 to a server 130. The program(s) of forwarding module 170 can be executed by processor 122. Forwarding module 170 includes a forwarding rules engine that can be used to determine whether to forward network data from local device 110. The forwarding rules engine includes one or more conditional rules that caching edge device 120 can use to determine whether to forward a request from a local device 110 to a server 130 or to block the request and electronically transmit a copy of the data stored to cache 160 to the local device 110. The forwarding rules engine can cause caching edge device 120 to selectively forward requests based on, for example, the domain of a server included in the request, the content of cache 160, and the status of communication link 152, among other options. Where the forwarding rules engine includes conditional rules to cause caching edge device 120 to selectively forward requests based on domain, forwarding rules engine can include conditional rules for each domain for which requests should be blocked and/or forwarded. Similarly, where the forwarding rules engine includes rules based on the content of cache 160, the forwarding rules engine can include conditional rules for individual data files stored to cache 160. Further, in some examples, the forwarding rules engine can include a trained computer-implemented machine learning model configured to accept elements or aspects of a request or system 100 and to output a determination of whether to forward a request, as discussed in more detail subsequently.

More specifically, forwarding module 170 can include one or more programs for scanning outbound data requests destined for a server 130 in order to determine whether the data should instead be served from cache 160 of caching edge device 120. Forwarding module 170 can scan outbound requests to servers 130 by, for example, inspecting the request to determine the domain of the server 130 and determining whether cache 160 includes data from the domain of the server 130 included in the request. Additionally and/or alternatively, the forwarding module 170 can inspect an outbound request to determine the content and/or identity of the requested data, and subsequently determine whether cache 160 includes the requested data. Forwarding module 170 can also determine whether to forward or block requests based on the availability of the requested server 130 by, for example, determining the status of communication link 152. In some examples, forwarding module 152 can be configured to only block outbound requests and serve data from cache 160 when communication link 152 has been disrupted such that caching edge device 120 is not connected to WAN 150.

After the programs of forwarding module 170 have determined to block a request, caching edge module 110 delivers data from cache 160. Forwarding module 170 can include one or more programs for causing the caching edge device to deliver data from cache 160. In some examples, forwarding module 170 can also include one or more programs for creating source information corresponding to the requested server 130, such that the data served from cache 160 appears to have been served from the requested server 130. For example, forwarding module 170 can include one or more programs for creating and/or modifying packet header information and/or other packet control information. Forwarding module 170 can create and/or modify packet header information by, for example, a spoofing technique. Accordingly, forwarding module 170 can cause packets of data from cache 160 served by caching edge device 120 to include source information (e.g., an origin address) corresponding to the requested server 130.

Caching module 180 includes one or more programs for creating and maintaining cache 160. Caching module 180 can, for example, cause caching edge device 120 to request and store data from servers 130 to cache 160. Caching module 180 can cause caching of data to cache 160 based on, for example, the frequency with which the data is requested by a local device 110, the size of the requested data, and the frequency with which data is requested by a local device 110 while communication link 152 is disrupted, among other options. Caching module 180 can also be configured to periodically update data stored to cache 160, as described previously.

System 10 and caching edge device 120 provide a number of advantages. Caching edge device 120 allows for local caching of data for devices of local network 140 without requiring the applications of local devices 110 to be configured to request data from cache 160. Rather, caching edge device 120 scans outbound requests for servers 130 and other computing devices connected to WAN 150 to determine whether to deliver data from cache 160. Caching edge device 120 can automatically deliver data from cache 160 in response to intercepting a request from a local device 110 for the same data from a server 130. Further, the position of caching edge device 120 between local network 140 and WAN 150 allows all outbound requests to be passed through (i.e., received and forwarded by) caching edge device 120. That is, by positioning caching edge device 120 at a funnel or chokepoint at the edge of local network 140, caching edge device 120 can intercept and scan all requests from local network 140 devices to WAN 150 devices (e.g., servers 130) without requiring local devices 110 or applications running on local devices 110 to be configured to request data specifically from caching edge device 120 or to be configured to send data to caching edge device 120 for forwarding to devices of WAN 150. In this manner, caching edge device 120 is advantageously able to provide a local cache for use by applications of local devices 110 that are not otherwise configured to use cached data. Caching edge device 120 is thereby advantageously able to be incorporated into existing systems and does not require any modification of other devices of those existing systems to provide data caching capabilities.

Notably, for some legacy systems, it can be significantly time- and labor-intensive to upgrade systems of a local network 110 to request data from a cache. Advantageously, caching edge device 120 can be incorporated into such local networks 110 to cache and provide data for legacy systems without requiring upgrading of those legacy systems. Further, as caching edge device 120 can be configured to provide, e.g., packet header information corresponding to the requested device of WAN 150 (e.g., a server 130), caching edge device 120 can be incorporated into existing systems without introducing errors caused by providing data from incorrect or unexpected network source addresses.

Advantageously, caching edge device 120 can deliver data from cache 160 in response to requests for the same data from servers 130 or other devices connected to WAN 150 while communication link 152 is disrupted (i.e., while caching edge device 120 is not connected to WAN 150), thereby decreasing the impact of disruptions to communication link 152 to the operation of devices connected to local network 140. Where local network 140 is an enterprise network operated by a business, unplanned outages of communication link 152 can, for example, disrupt business operations of the business that are performed by local network 140 devices (e.g., local devices 110) and require resources stored on WAN 150 devices (e.g., servers 130). Advantageously, caching edge device 120 can allow at least partial function of devices of local network 110 while communication link 152 is disrupted, thereby reducing disruptions to business operations performed by devices of local network 110 during outages of and other disruptions to communication link 152. Further, in some examples where there are large geographic distances s required for communication between caching edge device 120 and servers 130 or other devices connected to WAN 150, providing data from cache 160 of caching edge device 120 rather than distant devices of WAN 150 can reduce network latency and decrease the time required for a local device 110 to receive requested data.

Further, in some examples, communication link 152 may be data-capped connection or a connection that is metered by a service provider (e.g., by an internet service provider), such that reducing data transferred across communication link 152 can reduce costs associated with operating communication link 152. Additionally and/or alternatively, accessing and/or downloading data from a server 130 may incur costs from the entity maintaining the server 130. For example, the data requested from a server 130 can be an output from a monetized service platform (e.g., a cloud computing platform) that requires payment in exchange for access to the services of the platform. Caching edge device 120 can advantageously reduce data transfer for commonly-repeated data and service requests from servers connected to WAN 150 (i.e., devices accessed by data transmission across communication link 152). Specifically, caching edge device 120 can block outgoing requests for data stored to cache 160 and deliver data from cache 160 connected to local network 140, thereby reducing the total data transmitted across communication link 152 without affecting activity of the devices of local network 140. Further, caching edge device 120 can download and locally-host services from servers 130 and can provide outputs from those services in response to data requests from local devices 110. As described previously, caching edge device 120 can be integrated into existing networks to reduce data consumption and transmission across a data-capped or metered communication link without requiring reconfiguration of any local devices of the network or of any applications of those devices.

While caching edge device 120 has been discussed herein generally with respect to providing data requested by one or more devices of local network 110, caching edge device 120 can also be configured to store application data to cache 160. Caching edge device 120 can be configured to execute applications stored to cache 160 in response to requests by devices connected to local network 140 (e.g., local devices 110). Caching edge device 120 can be further configured to provide the outputs of those stored applications to devices of local network 140 in response to requests made by those devices.

While FIG. 1 depicts only four local devices 110A-N and three servers 130A-N, in other examples, system 100 can include any other suitable number of local devices 110A-N and server 130A-N. Further, as described previously, local devices 110A-N connected to local network 140 and servers 130A-N connected to WAN 150 can each be any suitable type computing device having networking capabilities. Further, while FIG. 1 depicts only one caching edge device 120, in some examples, multiple caching edge devices 120 can be positioned at various choke or funnel points between local network 140 and WAN 150. Each caching edge device 120 can include the same cached data or each caching edge device 120 can be configured to cache data based on usage and other characteristics of the local devices 110 that transmit network data through the caching edge device 120.

Caching edge device 120 can be a custom device incorporated at a funnel or chokepoint at an edge of an existing local network 140. Additionally and/or alternatively, caching edge device 120 can be created by providing an existing network edge device. For example, if cache 160 is relatively small in size, an existing network edge device can be configured with forwarding module 170 and caching module 180 to function as caching edge device 120 without additional hardware modification of the existing network edge device. In examples where cache 160 requires more storage than is available on an existing network edge device, the existing network edge device can be provided with additional hardware memory elements such that the existing network edge device has sufficient storage for cache 160. The existing edge device can be, for example, a router, a switch, or a gateway, among other options.

Notably, existing methods of providing a local cache that can be used by local devices 110 require modification the applications and/or programs that request data from devices connected to WAN 150. Specifically, existing methods of providing a local cache require applications and/or programs that request data from devices to be individually configured to determine whether to request data from a cache, and further to locate the local cache from which data can be requested. Conversely, system 100 allows for a single caching edge device 120 to perform caching logic for all devices connected to local network 140 and further to deliver data from local cache 160 to local devices 110, and thereby does not require any reconfiguration or modification of local devices 110 or the applications or programs thereof to provide local data caching.

Figure 2:
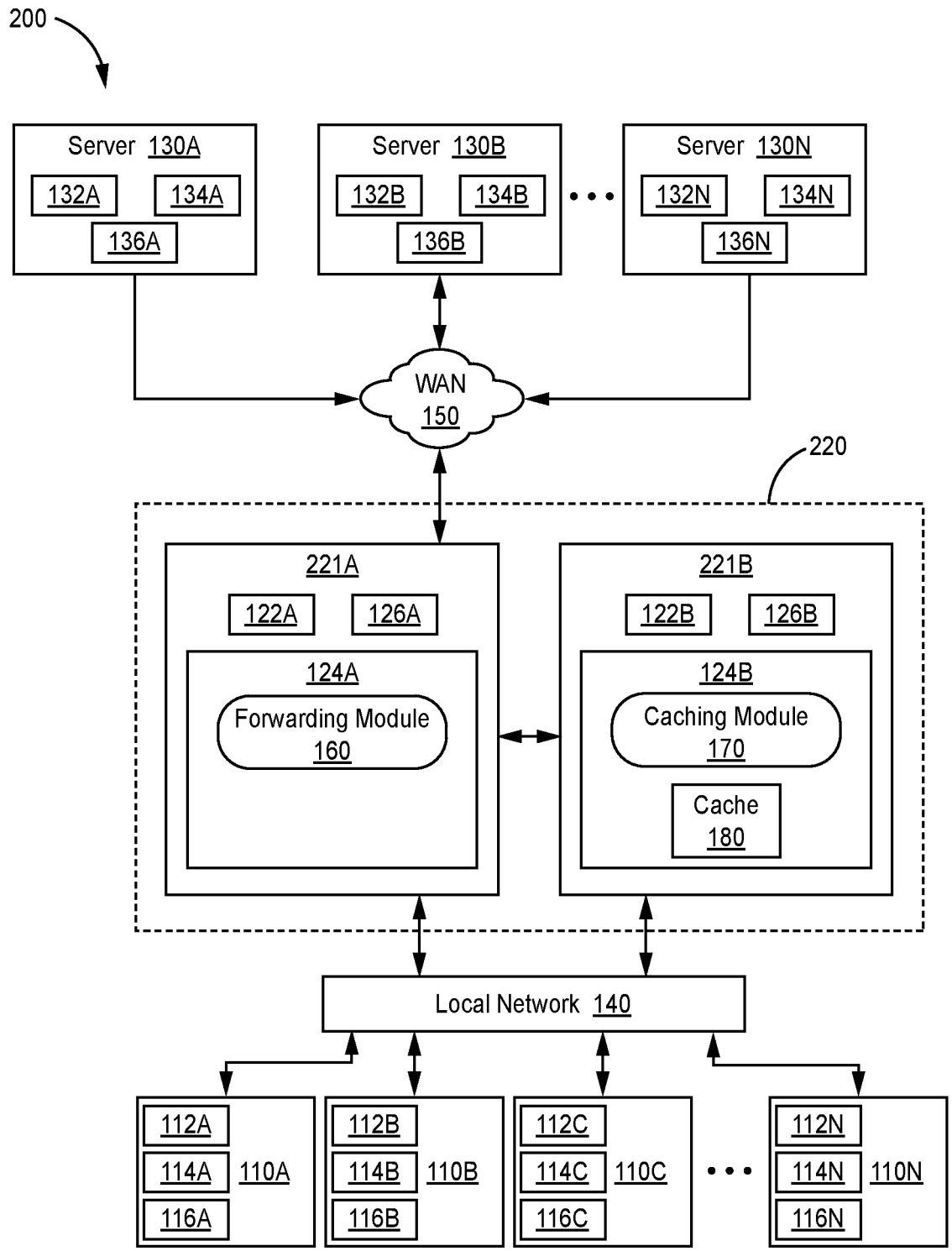
FIG. 2 is a schematic view of a further example of a system for local network edge caching.

Further, although caching edge device 120 has been described herein as a single device, in some examples the caching and networking edge functions of caching edge device 120 can be incorporated into separate devices of system 100, such that caching edge device 120 is composed of separate caching and edge devices. FIG. 2 depicts system 200, which is another example of a system for local network edge caching that includes a caching edge system composed of a caching device and an edge device. System 200 is similar to system 100 and includes local devices 110A-N, caching servers 130A-N, local network 140, and WAN 150. However, system 200 includes caching edge system 220 instead of caching edge device 120. Caching edge system 220 includes edge device 221A and caching device 221B. Edge device 221A includes processor 222A and memory 224A, and optionally includes user interface 226A. Edge device 221B includes processor 222B and memory 224B, and optionally includes user interface 226B. Processors 222A, 222B are substantially similar to processor 122; memories 224A, 224B are substantially similar to memory 124B; and user interface 226A, 226B are substantially similar to user interfaces 126. Advantageously, system 200 allows for a separate caching device having a relatively large cache 160 to be combined with existing network edge devices to form a caching edge system, reducing the cost and labor required to incorporate caching edge systems and devices according to the present disclosure into existing local networks.

In system 200, edge device 221A is directly connected to WAN 150 and memory 224A of edge device 221A includes forwarding module 160. Caching device 221B is not directly connected to WAN 150 and is directly connected to edge device 221A. Memory 224B includes caching module 170 and edge cache 180. In system 200, edge device 221 performs the forwarding and inspection functions of caching edge device 120 and caching device 221 performs the caching functions of caching edge device 120, as described previously with respect to FIG. 1. Caching device 221B can also optionally be directly connected to local network 140.

In operation, edge device 221A receives and selectively forwards network data (e.g., data or service requests) to servers 130A-N. Edge device 221A can use a forwarding rules engine encoded on memory 124A and/or other programs of forwarding module 160 to determine whether an outbound request should be forwarded. If edge device 221A determines that a request should be blocked and instead fulfilled by caching edge system 220, can request the data from cache 160 of caching device 221B. In some examples, caching device 221B is not connected to local network 140 and is in electronic communication with edge device 221A. Edge device 221A can cause caching device 221B to deliver the data to edge device 221A, and edge device 221A can subsequently deliver the data to the local device 110 that requested the data. Additionally and/or alternatively, caching device 221B is connected to local network 140 and edge device 221A can cause caching device 221B to deliver data from cache 160 to the requesting local device 110. In yet further examples, caching device 221B can be connected only to local network 140 and not directly connected to edge device 221A. In these examples, edge device 221A can be configured to send data and/or instructions via local network 140 to cause caching device 221B to deliver data from cache 160 to the requesting local device 110.

System 200 and caching edge system 220 advantageously provide the advantages of edge caching provided by system 100 and edge device 120 (FIG. 1). Further, including separate caching and edge devices 221A, 221B allows caching edge system 220 to be implemented on existing network infrastructure without requiring extensive modification. Cache 160 can require a large amount of data storage in examples where cache 160 stores large files and/or a large quantity of files. Conversely, forwarding module 170 has a relatively small storage size and can be stored to smaller hardware memory units that may be present on existing network edge devices. Accordingly, edge device 221A can be created by configuring an existing network edge device (e.g., a router, gateway, etc.) to execute the programs of forwarding module 170 without requiring upgrading or modification of the hardware elements of the existing network edge device. Caching device 221B can be configured to include a large amount of storage and connected to edge device and/or local network 140. A caching device 221B having sufficient data storage for cache 160 can be separately constructed and connected to edge device 221A and/or local network 140 to create caching edge system 220 without requiring modification or reconfiguration of the existing components of local network 140. For example, caching device 221B can be a storage server or network attached storage (NAS) device that can be connected to edge device 221 and/or local network 140. Caching device 221B can also be implemented on the hardware of another device connected to network 140. For example, caching device 221B can be an electronic database or another suitable virtual storage element stored by a local device 110.

Figure 3:
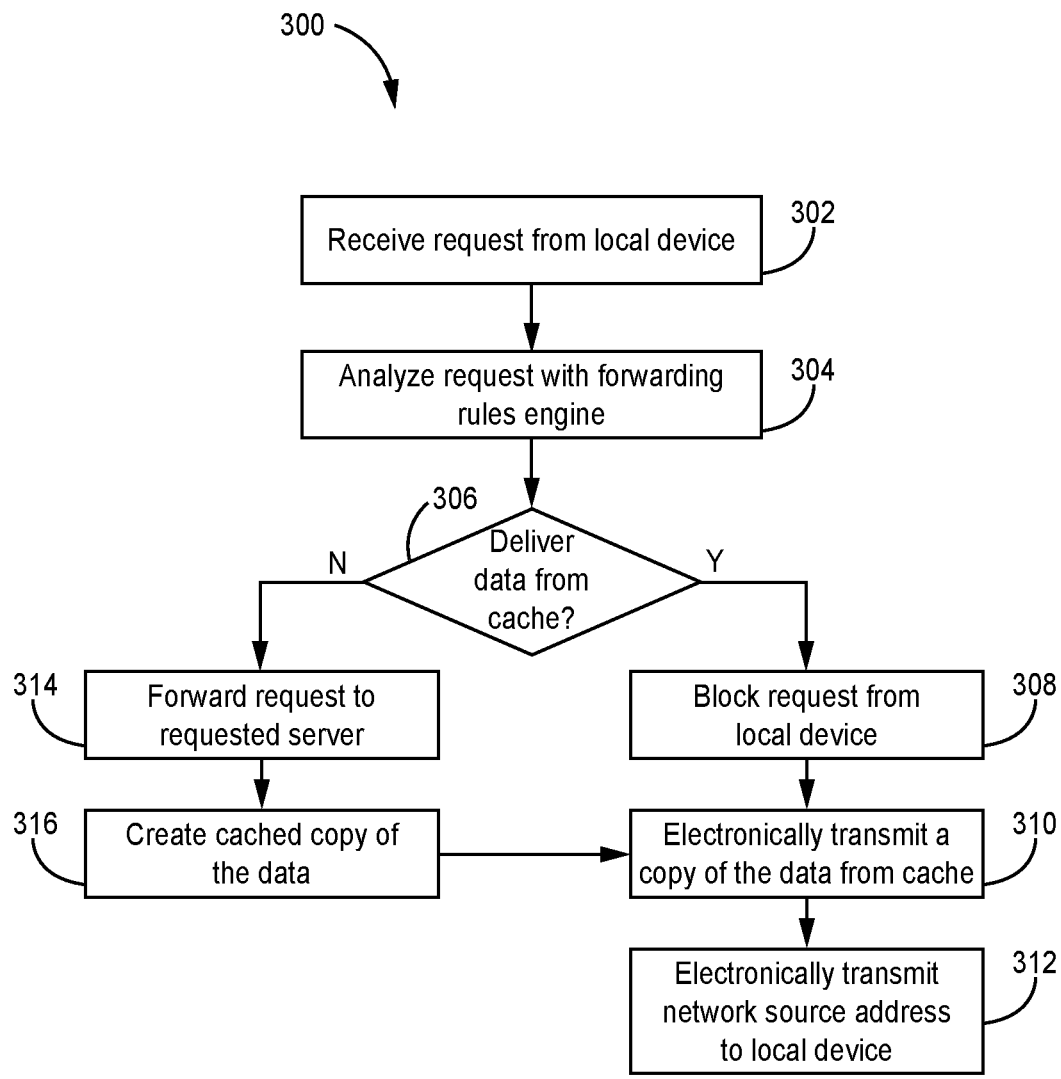
FIG. 3 is a flow diagram of an example of a method of edge caching suitable for use with the systems of FIGS. 1 and 2.

FIG. 3 is a flow diagram of method 300, which is a method of edge caching performable by the caching edge device 120 (FIG. 1) and caching edge system 220 (FIG. 2). Method 300 includes steps 302-316 of receiving a request from a local device (step 302), analyzing the request with a forwarding rules engine (304), determining whether to deliver a local copy of the requested data (step 306), blocking the request from the local device (step 308), electronically transmitting a copy of the data from the cache (step 310), electronically transmitting network source information to the local device (step 312), forwarding the request to the requested server (step 314), and creating a cached copy of the data (step 316). Method 300 will be discussed generally with respect to system 100 and caching edge device 120 (FIG. 1) for explanatory purposes, but method 300 can be adapted to be used with any suitable system for edge caching and/or any suitable caching edge device (e.g., system 200 and/or caching edge device 220; FIG. 2).

In step 302, caching edge device 120 receives a request from a local device 110. The request is transmitted to caching edge device 120 via local network 140 and is a request for data from a server 130 connected to WAN 150. The request includes network address information for the requested server. The local device requesting the data can be referred to as a "requesting device" or a "requesting local device" and the server targeted by the request can be referred to as a "requested server" or "requested device."

In step 304, the request received in step 304 is analyzed using a forwarding rules engine. In step 306, caching edge device 120 determines whether to forward the request or whether to block the request and deliver data from cache 160 based on the results of the analysis performed in step 304. The forwarding rules engine includes one or more conditional rules that can be used by processor 112 to determine whether the outbound request received in step 302 should be forwarded or whether the request should be blocked and the requested data delivered from a local cache (e.g., cache 160). The conditional rules of the forwarding rules engine can be stored to memory 124 of caching edge device 120 and, in some examples, can be encoded as a table, array, matrix, database, or other suitable structure. The forwarding rules engine can include conditional rules relating to, for example, a network address element of the requested server 1320 (e.g., the domain of the server), the status of communication link 152, or another suitable aspect of system 100 and/or the request received in step 302. Processor 102 can inspect the contents of the outbound request (e.g., a domain or another element of the request) as well as the operational status and/or another aspect of system 100 (e.g., the operational status of communication link 152) according to the conditional rules of the forwarding rules engine in step 304. In step 306, processor 102 can determine whether to forward the request from the local machine 110 or block the request and deliver the requested data from cache 160.

In some examples, the forwarding rules engine can include one or more conditional rules based on the data stored to cache 160, such that the caching edge device 120 selectively forwards requests based on the content of cache 160. More specifically, the forwarding rules engine can be configured such that caching edge device 120 forwards requests for data not stored to cache 160 and blocks requests for data stored to cache 160. In these examples, the forwarding rules engine can additionally be configured to cause caching edge device 120 to selectively forward requests based on another aspect of system 100, such as the status of communication link 152.

In examples where the forwarding rules engine used in step 304 includes at least two conditional rules, the conditional rules can be ordered, such that the forwarding rules engine causes processor 112 to inspect the contents of the request with each conditional rule in a pre-defined order. As a specific example, the forwarding rules engine can cause caching edge device 120 to first determine the status of communication link 152. If communication link 152 is operational, the forwarding rules engine can cause caching edge device 120 to forward all outbound requests without requiring further inspection of the contents of the request (e.g., a domain of the requested server). If caching edge device 120 determines that communication link 152 is not operational, the forwarding rules engine can then cause caching edge device 120 to inspect request contents, such as the domain of the requested server 130, to determine whether to forward the request or to block the request.

If caching edge device 120 determines to block the request and deliver a local copy of the data from cache 160, method 300 proceeds to step 308 following step 306. If caching edge device 120 determines to forward the request, method 300 proceeds to step 314 following step 306.

In step 308, the request is blocked by caching edge device 120. Caching edge device 120 can block the request by refusing to forward the request to the requested server 130 or otherwise preventing transmission of the request through communication link 152 to WAN 150. In step 310, a copy of the requested data is transmitted to the requesting local device from cache 160. Caching edge device 120 can, for example, inspect the domain of the requested server 130 or another element of the request received in step 304 to determine the identity and/or content of the requested data. Caching edge device 120 can then electronically transmit the requested data to the requesting local device 110 via local network 140.

Method 300 optionally includes step 312. In step 312, caching edge device 120 electronically transmits the network source address of the requested server 130 to the requesting local device 110. More specifically, caching edge device 120 can create and/or modify network source address information included with the data transmitted in step 310 to be the network address the requested server rather than the network address of caching edge device 120. Caching edge device 120 can create and/or modify network source address information by, for example, a spoofing technique. Steps 310 and 312 can be performed at substantially the same time, such that the data and network source information are transmitted at the same time or substantially the same time. For example, the network source information transmitted in step 312 can be packet header information included with packets encoding the data transmitted in step 310.

Step 314 is performed following a determination by caching edge device 120 to forward the request to the requested server in step 306. In step 314, caching edge device 120 forwards the request to the requested server via communication link 152 and WAN 150. Subsequent to step 314, caching edge device 120 can also forward data received from the requested server 130 to local network 140 and/or the requesting local device 110.

Method 300 optionally includes step 316 in some examples where cache 160 does not include the data requested by the local device (i.e., the requesting local device from which the request is received in step 302). In step 316, a cached copy of the requested data is created and stored to cache 160 of memory 124. In some examples, caching edge device 120 can create the cached copy by separately requesting the data from the server 130. Caching edge device 120 can receive the data via communication link 152 and store a copy of the data to cache 160. In other examples, caching edge device 120 can use the copy of the data received in response to the request forwarded in step 314 to create the cached copy. Caching edge device 120 can, for example, create the cached copy as data is received from the requested server 130 and forwarded to the requesting local device 110. Additionally and/or alternatively, caching edge device 120 can receive the requested data from the requested server 130, store a copy to cache 160, and transmit the copy of the data stored to cache 160 to the requesting local device 120.

Advantageously, method 300 can be performed by a caching edge device according to the present disclosure to automatically determine whether to deliver data from a local cache stored or to forward requests for data from a local device to a server or other electronic device not connected to a local network. Where the local cache does not include the data requested by the requesting local device, method 300 allows cache 160 to be performed to store the data to cache 160 such that data can be delivered from cache 160 rather than the requested server 130 following a subsequent request from a local device 110. Method 300 accordingly provides the advantages described previously with respect to FIG. 1. Method 300 allows for the delivery of data stored by devices and servers outside of a local network during periods in which a communication link between a local network and a wide area network (e.g., an internet connection) connecting a data source (e.g., a server) to the local network is not operational. The data delivered by method 300 is stored to a local cache contained within a local network and, therefore, delivery of data according to steps 310-312 is not dependent on the status of a connection between the local network and the wide area network. Delivery of data from a local cache via method 300 can also be used to reduce costs associated with accessing WAN-connected devices via a communication link (e.g., communication link 152) that is data-capped or metered by a service provider (e.g., an internet service provider). Similarly, delivery of data from a locally-hosted copy of a monetized data service can be used to reduce costs associated with accessing and requesting data and other outputs from some servers 130.

Method 300 can be repeated and/or performed continuously by caching edge device 120 for all outbound requests received by caching edge device 120. Further, caching edge device 120 can perform multiple instances of method 300 simultaneously or substantially simultaneously, thereby allowing caching edge device 120 to determine whether to forward requests received simultaneously or substantially simultaneously without introducing a substantial delay in the operation of local devices 110.

Figure 4:
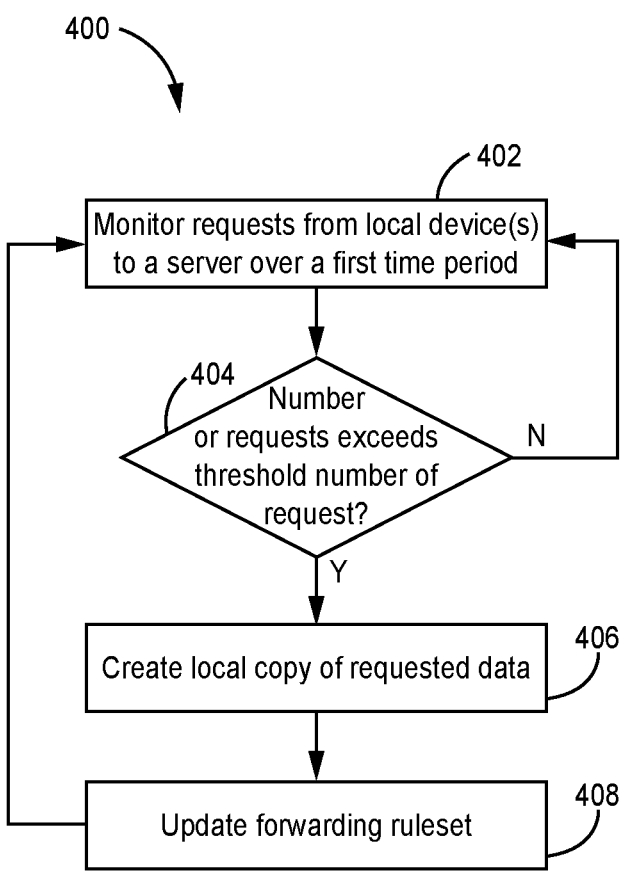
FIG. 4 is a flow diagram of an example of a method of caching data from a server to a caching edge device suitable for use with the systems of FIGS. 1 and 2.

FIG. 4 is a flow diagram of method 400, which is a method of caching data from a server to a caching edge device, such as caching edge device 120 and/or caching edge device 220. Method 400 includes steps 402-408 of monitoring requests from one or more local devices to a server over a monitoring period (step 402), determining whether the number of requests during the monitoring period exceeds a threshold number of requests (step 404), downloading the requested data (step 406), and updating the forwarding rules engine (step 408). Method 400 can be performed by a caching edge device (e.g., caching edge device 120 and/or caching edge device 220; FIGS. 1-2) to select data to be stored to the cache of the caching edge device (e.g., cache 160; FIG. 1).

In step 402, requests for a server from local devices of a local network are monitored for a monitoring period (e.g., local devices 110 of local network 140; FIG. 1). The number of requests can be tracked for each server from which data is requested during the first time period. The number of requests can further be tracked by domain to distinguish requests from different servers. Additionally and/or alternatively, the number of requests tracked according to the requested data and/or by another element of the requests received from the devices of the local network in examples where more than one data source is stored by a single server. The monitoring period is a period of time over which the requests are monitored. The monitoring can be any suitable period of time and can be determined based on, for example, the expected rate of requests from local machines 110, among other options.

In step 404, processor 112 determines whether the number of requests during the monitoring period (i.e., the time period for which requests were monitored in step 402) exceeds a threshold number. The threshold value can be based on, for example, the available storage of the cache, the size of the requested data, or another suitable value. If the number of requests does not exceed the threshold number, method 400 proceeds to step 402 and the caching edge device again begins to monitor outbound requests. If the number of requests does exceed the threshold number, method 400 proceeds to step 406.

In step 406, the caching edge device creates a local copy of the requested data (i.e., the data requested over the threshold number of times during the monitoring period). The caching edge device can create the local copy by, for example, requesting the data from the server and storing a copy of the data received from the server to the local cache (e.g., cache 160). In step 408, the caching edge device updates the forwarding rules engine used in, e.g., step 306 of method 300. In step, forwarding rules engine is updated or modified to allow requests for the downloaded data to be blocked and instead be delivered from the cache of the caching edge device. In step 408, the caching edge device can modify the forwarding rules engine used with steps 304-306 of method 300 to cause the caching edge device to block future requests for the data stored to the cache in step 406 and deliver the stored data to the requesting local device. Step 408 can be performed automatically by, for example, a processor of the caching edge device. Additionally and/or alternatively, step 408 can be performed manually, such as by an operator interacting with a user interface of the caching edge device. Following step 408, method 408 proceeds to step 402 and method 400 can be repeated.

Advantageously, method 400 allows for the cache of the caching edge device to be automatically updated based on activity of the local devices, as determined based on requests from the local devices sent to a wide area network through the caching edge device. Further, method 400 allows for the forwarding rules engine used to determine whether to forward a request to a WAN-connected server or to deliver data from the local cache to be automatically updated.

In some examples, a machine learning algorithm can be used to perform step 304 of method 300. The machine learning algorithm can be trained to, for example, accept parameters of system 100, 200 and/or an element of a request from a local machine 110 and output a determination of whether a request should be forwarded or whether the request should be blocked and data delivered from a local cache. The machine learning algorithm can be trained using, for example, a forwarding rules engine including one or more conditional rules. Additionally and/or alternatively, the machine learning algorithm can be trained using a labeled training set of requests or of request information (e.g., header information, etc.). Advantageously, using a machine learning model to determine whether to forward a request or deliver data from a local cache provides greater flexibility to a system including a caching edge device according to the present disclosure. More specifically, a trained computer-implemented machine learning model can be configured recognize a broader range of requests as requesting data that can be fulfilled by the local cache than a forwarding rules engine including only conditional rules. Further, the pattern-recognition capabilities of a trained computer-implemented machine learning model can allow recognition of situations where it is useful to deliver data from a local cache that are difficult for a human programmer or operator to recognize.

Figure 5:
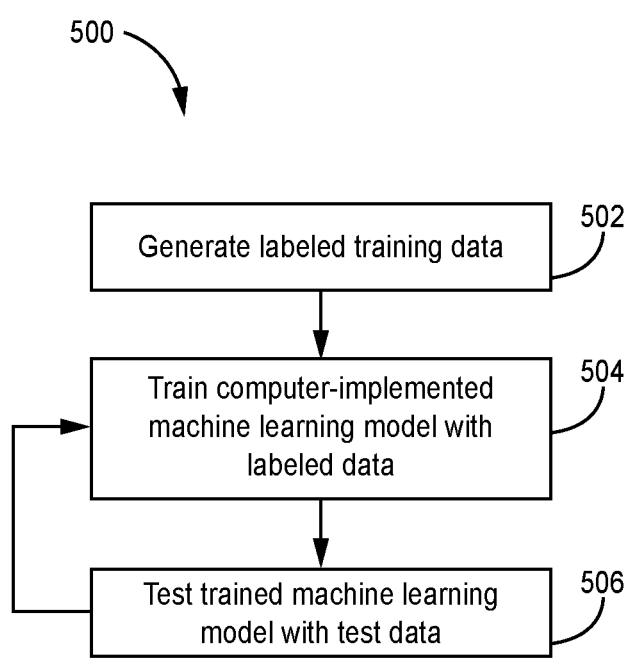
FIG. 5 is a flow diagram of an example of a method of training a computer-implemented machine learning model suitable for use with the method of FIG. 3.

FIG. 5 is a flow diagram of method 500, which is a method of training a machine-learning algorithm according to the present disclosure. Machine learning algorithms trained according to method 500 are capable of accepting as inputs one or more aspects or elements of a request (e.g., a packet header element, etc.) and/or one or more aspects of systems 100, 200 (e.g., the operational status of communication link 152), and outputting a determination as to whether a request should be forwarded or whether the request should be blocked and data delivered from cache 160. Method 500 includes steps of 502-506 of generating labeled training data (step 502), training a computer-implemented machine learning model with the labeled data (step 504), and testing the trained computer-implemented machine learning model with test data (step 506).

In step 502, labeled training data is generated. The labeled data can be, for example, labeled requests from local devices 110, labeled data that is extractable from requests from local devices 110, and/or labeled data describing the operational status of elements of systems 100, 200 (e.g., the operational status of communication link 152), among other options. The training data can be collecting a set of requests for data from local devices 110 and labeling each request according to whether the request should be forwarded or blocked in step 306 of method 300 (FIG. 3).

In step 504, the labeled data is used to train the computer-implemented machine learning model. As used herein, "training" a computer-implemented machine learning model refers to any process by which parameters, hyper parameters, weights, and/or any other value related model accuracy are adjusted to improve the fit of the computer-implemented machine learning model to the training data.

In step 506, the trained computer-implemented machine learning model is tested with test data. The test data used in step 506 is unlabeled data of the same variety as the training data that is used to qualify and/or quantify performance of the trained computer-implemented machine learning model. More specifically, a human or machine operator can evaluate the performance of the machine learning model by evaluating the fit of the model to the test data. As depicted in FIG. 5, steps 504 and 506 can be performed iteratively to improve the performance of the machine learning model. More specifically, if the fit of the model to the unlabeled data determined in step 506 is undesirable, step 506 can be repeated to further adjust the parameters, hyper parameters, weights, etc. of the model to improve the fit of the model to the test data. Step 506 can then be repeated with a new set of unlabeled test data to determine how the adjusted model fits the new set of unlabeled test data. If the fit continues to be undesirable, further iterations of steps 504 and 506 can be performed until the fit of the model becomes desirable.

The methods and systems described herein advantageously allow for the creation and use of systems that can provide local caching capabilities. As described previously, the systems and methods for local caching described herein allow for the delivery of data during intermittent outages of a connection between a local network and a WAN (e.g., the Internet). Local caching according to the present disclosure can also be used to reduce usage of a metered or data-capped WAN connection and/or of monetized data services hosted by a WAN-connected device. Further, the systems and methods described herein allow for local caching without requiring any hardware or software modification of any device or component connected to the local network.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method of selectively providing data from a caching edge device, the method comprising:
    receiving, by the caching edge device, a request from a local device for data stored on a server, wherein:
        the caching edge device is configured to receive requests from the local device and to selectively forward the requests to the server,
        the request includes a domain of the server,
        the server is intermittently connected to the caching edge device, and
        the caching edge device is configured to selectively forward requests to the server when the server is connected to the caching edge device;

determining, by the caching edge device, whether to deliver to the local device a copy of the data by analyzing the request using a forwarding rules engine including a computer-implemented machine learning model, wherein:
analyzing the request using the forwarding rules engine comprises:
analyzing the domain of the server,
inspecting the memory to determine whether the memory stores the copy of the data, and
determining whether the server is connected to the caching edge device, and the computer-implemented machine learning model is trained to:
accept, as inputs, requests for data, and
output determinations of whether to block the requests for data and transmit local copies of data, and
the copy of the data is stored to a memory of the caching edge device;
after determining that the memory does not store the copy of the data:
requesting the data from the server;
receiving the data from the server; and
storing the data to the memory to create the copy of the data; and
after determining to deliver the copy of the data to the local device:
electronically transmitting, by the caching edge device, the copy of the data from the memory of the caching edge device to the local device; and
blocking, by the caching edge device, the request from the local device to the server.

2. The method of claim 1, wherein electronically transmitting the copy of the data from the memory of the caching edge device to the local device comprises electronically transmitting, by the caching edge device, a network source address to the local device, wherein:
the network source address is configured to identify a source of the copy of the data; and
the network source address corresponds to a network address of the server.

3. The method of claim 2, wherein the data requested by the local device is an application library.

4. The method of claim 3, and further comprising:
monitoring requests from the user device to the server over a first time period;
determining that a number of requests from the user device to the server for the data during the first time period exceeds a threshold number of requests; and
downloading the data to the memory after determining that the number of requests exceeds the threshold number of requests.

5. The method of claim 4, wherein monitoring requests from the user device to the server over the first time period comprises monitoring requests from the user device to the server over the first time period after receiving the request from the local device for the data.

6. A system comprising:
a local device connected to a local network;
a server not connected to the local network and accessible by a wide area network; and
a caching edge device connected to the local device by the local network and connected to the wide area network, the caching device configured to receive requests from the local device and to selectively forward the requests to the server, the caching edge device comprising:
a processor; and
at least one memory encoded with instructions that, when executed, cause the processor to:
receive a request from the local device for data stored on the server;
determine, before forwarding the request for the data to the server, whether to deliver to the local device a copy of the data by analyzing the request using a forwarding rules engine, including a computer-implemented machine learning model, wherein:
analyzing the request using the forwarding rules engine comprises:
analyzing the domain of the server,
inspecting the memory to determine whether the memory stores the copy of the data, and
determining whether the caching edge device is connected to the wide area network, and
the computer-implemented machine learning model is trained to:
accept, as inputs, requests for data, and output determinations of whether to block the requests for data and transmit local copies of data, and
the copy of the data is stored to a memory of the caching edge device;
after determining that the memory does not store the copy of the data:
request the data from the server;
receive the data from the server, and
store the data to the memory to create the copy of the data; and
after determining to deliver the copy of the data to the local device:
electronically transmit the copy of the data from the at least one memory of the caching edge device to the local device; and
block the request from the local device to the server.

7. The system of claim 6, wherein electronically transmitting the copy of the data from the at least one memory of the caching edge device to the local device comprises electronically transmitting, by the caching edge device, a network source address to the local device, wherein:
the network source address is configured to identify a source of the copy of the data; and
the network source address corresponds to a network address of the server.

8. The system of claim 6, wherein the data requested by the local device is an application library.

9. The system of claim 6, wherein the instructions, when executed, further cause the processor to:
monitor requests from the user device to the server over a first time period;
determine that a number of requests from the user device to the server for the data during the first time period exceeds a threshold number of requests; and
download the data to the memory after the processor has determined that the number of requests has exceeded the threshold number of requests during the first time period.

10. The system of claim 6, wherein:
the caching edge device comprises an edge device and a caching device;
the edge device comprises a first memory of the at least one memory;
the first memory is encoded with the instructions;
the caching device comprises a second memory of the at least one memory; and
the second memory stores the copy of the data.

11. A method of selectively providing data from a caching edge device, the method comprising:
  receiving, by the caching edge device, a request from a local device for data stored on a server, the caching edge device configured to receive requests from the local device and to selectively forward the requests to the server;
  determining, by the caching edge device, whether to deliver to the local device a copy of the data by analyzing the request with a computer-implemented machine learning model trained to:
    accept, as inputs, requests for data, and
    output determinations of whether to block the requests for data and transmit local copies of data, and
  after determining to deliver the copy of the data to the local device:
    electronically transmitting, by the caching edge device, the copy of the data from the memory of the caching edge device to the local device; and
    blocking, by the caching edge device, the request from the local device to the server.

* * * * *